United States Patent [19]

Maisch

[11] Patent Number: 5,267,785
[45] Date of Patent: Dec. 7, 1993

[54] METHOD FOR SWITCHING A PRESSURE CONTROL DEVICE

[75] Inventor: Wolfgang Maisch, Schwieberdingen, Fed. Rep. of Germany

[73] Assignee: Robert Bosch GmbH, Stuttgart, Fed. Rep. of Germany

[21] Appl. No.: 983,351

[22] Filed: Nov. 30, 1992

[30] Foreign Application Priority Data

Dec. 18, 1991 [DE] Fed. Rep. of Germany ....... 4141751

[51] Int. Cl.$^5$ .............................. B60T 8/32
[52] U.S. Cl. .................. 303/119.2; 303/92; 303/901
[58] Field of Search .......... 303/119.2, 119.1, 117.1, 303/900, 901, 113.2, 116.1, 115.4, 113.3, 113.5, 92; 251/129.02, 129.19; 188/181 A, 181 R

[56] References Cited

U.S. PATENT DOCUMENTS

| | | | |
|---|---|---|---|
| 3,981,543 | 9/1976 | Atkins | 303/115.4 |
| 5,002,344 | 3/1991 | Hashida | 303/92 X |
| 5,167,442 | 12/1992 | Alaze et al. | 303/901 X |

Primary Examiner—Douglas C. Butler
Attorney, Agent, or Firm—Edwin E. Greigg; Ronald E. Greigg

[57] ABSTRACT

A method for switching a pressure control device in which the pressure control device is switched only whenever the pressure of the pressure fluid prevailing on the master brake cylinder side of the pressure control device exceeds a predetermined switching pressure of the pressure control device. In this way, the switching frequency and hence wearing of the pressure control device are greatly reduced. The magnet coil is designed or excited such that it heats to a lesser extent upon its excitation. The method is especially suitable for pressure control devices that are provided in a hydraulic brake system for motor vehicles having an anti-skid system.

6 Claims, 3 Drawing Sheets

METHOD FOR SWITCHING A PRESSURE CONTROL DEVICE

BACKGROUND OF THE INVENTION

The invention is based on a method for switching a pressure control device that is disposed in a hydraulic brake system having an anti-skid system, especially for motor vehicles, as defined hereinafter. German Patent Application P 41 24 241.6 (U.S. patent application, Ser. No. 07/904,085 filed Jun. 25, 1992) has already proposed a pressure control device for a hydraulic brake system equipped with an anti-skid system, which if the anti-skid system fails reduces the brake pressure in the rear wheel brake cylinders of the vehicle compared with the brake pressure in the front wheel brake cylinders, in order to prevent locking of the rear wheels before locking of the front wheels of the vehicle and thus to assure steerability of the vehicle. The pressure control device should be actuated regularly, specifically each time the vehicle is braked, to prevent the pressure control device from sticking. In the process, the magnet coil of the pressure control device is excited upon each braking, optionally for a relatively long time, and hence may under some circumstances be strongly heated. Because the pressure control device is switched so very frequently, the danger exists that the pressure control device will wear excessively and leak, especially at its valve seat and valve closing member.

OBJECT AND SUMMARY OF THE INVENTION

The method according to the invention for switching a pressure control device has the advantage over the prior art that the switching frequency and hence the wear of the pressure control device are greatly reduced, because the pressure control device is not switched in vehicle braking at low master brake cylinder pressures of the pressure fluid. To enable switching of the pressure control device into its fully opened position if a predetermined switching pressure $p_S$ is exceeded by the pressure of the pressure fluid prevailing on the master brake cylinder side of the pressure control device, the magnet coil of the pressure control device must generate lesser magnet forces at the armature compared with known pressure control devices, and is therefore designed and excited in such a way that it heats less strongly when excited. This is especially important because since the master brake cylinder actuation may persist for an arbitrarily long time, the pressure control device must be designed for continuous excitation, and thus must be designed to be capable of being on continuously.

For good, more-uniform vehicle deceleration, it is advantageous if the predetermined switching pressure $p_S$ required for the switchover to the open position is less than a predetermined opening pressure $p_ö$ of the pressure control device.

For the same reason, it is also advantageous if the pressure control device opens at an opening pressure $p_ö$ on the master brake cylinder side that is less than the predetermined switching pressure $p_S$, and if the motion of the pressure control device to its fully opened position does not occur until the predetermined switching pressure $p_S$ is exceeded.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
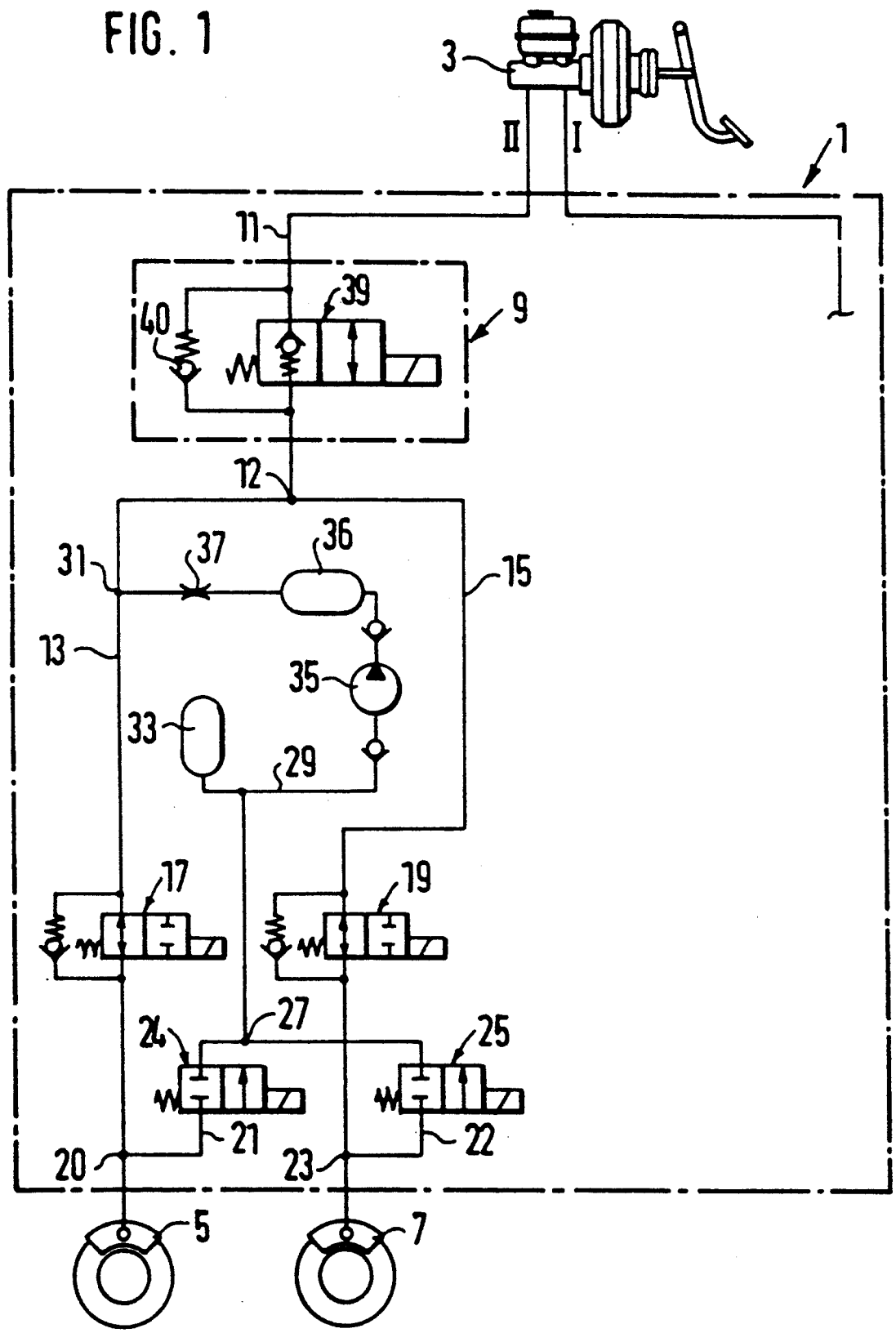
FIG. 1 is a circuit diagram for a hydraulic brake system having a pressure control device.

The hydraulic motor vehicle brake system 1 shown by way of example in FIG. 1, having an anti-lock system, has a pedal-actuatable master brake cylinder 3, to which two brake circuits I and II are connected. Brake circuit I, which for instance acts on the front wheel brakes of the vehicle, has been omitted from FIG. 1; it may be embodied in a known manner.

Brake circuit II has a brake line 11 leading from the master brake cylinder 3 to wheel brakes 5 and 7 of rear wheel brakes of the vehicle. The brake line 11 splits at a connection point 12 into a first brake line branch 13 and a second brake line branch 15, which are assigned to the wheel brake cylinder 5 and the wheel brake cylinder 7, respectively. One inlet valve 17, 19, in the form of a 2/2-way magnet valve that is open when without current is disposed in each of the brake line branches 13, 15, and the brake pressure of the wheel brake cylinders 5 and 7 can be controlled by these respective inlets valves. On the wheel brake cylinder side of the inlet valves 17, 19, one respective return line branch 21, 22 branches off from each of the brake line branches 13,15 at respective connection points 20, 23. One outlet valve 24, 25, for instance in the form of a 2/2-way magnet valve that is closed when without current, is disposed in each of the return line branches 21, 22 and enables the reduction of pressure in the wheel brake cylinders 5, 7. Remote from the wheel brake cylinders 5, 7, the return line branches 21, 22 are joined together to form one common return line 29 at a connection point 27, downstream of the outlet valve 24, 25; the return line 29 communicates with the brake line 13 at a connection point 31, for instance between the connection point 12 and the inlet valve 17. A reservoir chamber 33, a return pump 35, a damper chamber 36 and a throttle 37 are disposed in that order in the return direction toward the connection point 31 in the return line 29.

Upon actuation of the master brake cylinder 3, brake pressure can be generated in the wheel brake cylinders 5 and 7 by the displacement of quantities of pressure fluid through the brake line 11. In the pressure buildup phase, in which pressure is being built up in the wheel brake cylinders, the inlet valves 17, 19 are in the open position and the outlet valves 24, 25 in the shutoff position. If at least one of the vehicle wheels threatens to lock during braking, then the inlet valves 17, 19 and the outlet valves 24, 25 of the anti-lock system are triggered by an electronic control unit, not shown, in accordance with a known adaptive control algorithm such that a brake pressure modulation that is optimized for the braking conditions occurs in the wheel brake cylinders 5, 7. For instance, if the pressure of the pressure fluid in the wheel brake cylinders 5, 7 is reduced in order to prevent locking of the vehicle wheels, then the inlet valves 17, 19 are closed and the outlet valves 24, 25 are opened, so that the pressure fluid flows into the reservoir chamber 33, and a rapid pressure reduction in the wheel brake cylinders 5, 7 ensues. In this pressure reduction phase, the inlet valves 17, 19 are accordingly in the closing position and the outlet valves 24, 25 in the open position. The return pump 35 is turned on during the entire anti-lock function and pumps the pressure fluid out of the reservoir chamber 33, disposed on the intake side of the return pump 35, into the brake line branch 13, for example. In a pressure holding phase, in which the pressure of the pressure fluid in the wheel brake cylinders 5, 7 is to be kept constant, both the inlet valves 17, 19 and the outlet valves 24, 25 are switched to the shutoff position.

A pressure control device 9, by which the pressure of the pressure fluid in the wheel brake cylinders 5, 7 can be varied, is disposed in the brake line 11, for instance between the master brake cylinder 3 and the connection point 12. The pressure control device 9 comprises a magnet valve 39, which in the currentless state assumes a spring-actuated position, in which a first integrated, spring-loaded check valve is operative, which does not allow the flow of pressure fluid until a predetermined differential pressure between the master brake cylinder side and the wheel brake cylinder side of the pressure control device 9 is reached, and a second check valve 40 which acts in the opposite flow direction is disposed parallel to it. The task of the pressure control device 9 is to avoid locking of the rear wheels before locking of the front wheels of the vehicle in the event of a failure of the anti-lock system, by reducing the pressure in the wheel brake cylinders 5, 7.

In the normal situation, that is, with the anti-lock system intact, upon actuation of the master brake cylinder 3 to brake the vehicle, a supply voltage is present at the magnet valve 39 of the pressure control device, which valve is closed when without current. The pressure control device 9 is embodied or excited such that despite electrical excitation, the pressure control device is not moved into its free open position by switching of the magnet valve 39, until the inlet pressure on the master brake cylinder side exceeds a predetermined switching pressure of the pressure control device 9, so that in that case, the pressure control device 9 exerts no influence on the pressure of the pressure fluid in the wheel brake cylinders 5, 7.

However, in a departure from the hydraulic circuit diagram of the motor vehicle brake system 1 shown in FIG. 1, it is also possible to provide one pressure control device 9 each between the wheel brake cylinders 5 and 7 of the rear wheels of the vehicle and the corresponding connection points 20 and 23 of the brake line branches 13 and 15. This arrangement is required with diagonal dual-circuit brake systems, for instance, at the wheel brake cylinders of the rear wheels, in order to maintain stability of the vehicle upon actuation of the brake system in the event that the anti-lock system should fail.

In the event of a failure of the anti-lock system of the hydraulic brake system 1, the pressure control device 9 serves to prevent premature locking of the rear wheels prior to locking of the front wheels of the vehicle, and thus to maintain stability of the vehicle even during braking. To this end, upon a failure of the anti-lock system, the power supply to the pressure control device 9 is interrupted, and the spring-actuated position is thereby made operative. If the master brake cylinder 3 is actuated, then quantities of pressure fluid are sent through the brake line 11 into the pressure control device 9. If the pressure of the pressure fluid on the master brake cylinder side exceeds the pressure toward the wheel brake cylinder side in the pressure control device 9 by some characteristic, preset pressure value of the first spring-actuated check valve of the pressure control device 9, then the first check valve enables the flow of pressure fluid in the direction of the wheel brake cylinders 5, 7. The magnitude of the pressure of the pressure fluid is reduced toward the wheel brake cylinder, compared with that toward the magnet brake cylinder, by the characteristic pressure value of the first check valve of the magnet valve 39.

To enable relaxing the pressure in the wheel brake cylinders 5 and 7 and thus release the rear wheel brakes of the vehicle, the second spring-loaded check valve 40 is provided in the pressure control device 9; it is connected parallel to the 2/2-way magnet valve 39 and allows a return flow of pressure fluid toward the master brake cylinder 3 if the pressure toward the master brake cylinder drops below the pressure toward the wheel brake cylinder by a value that is predetermined by the second check valve 40.

Figure 2:
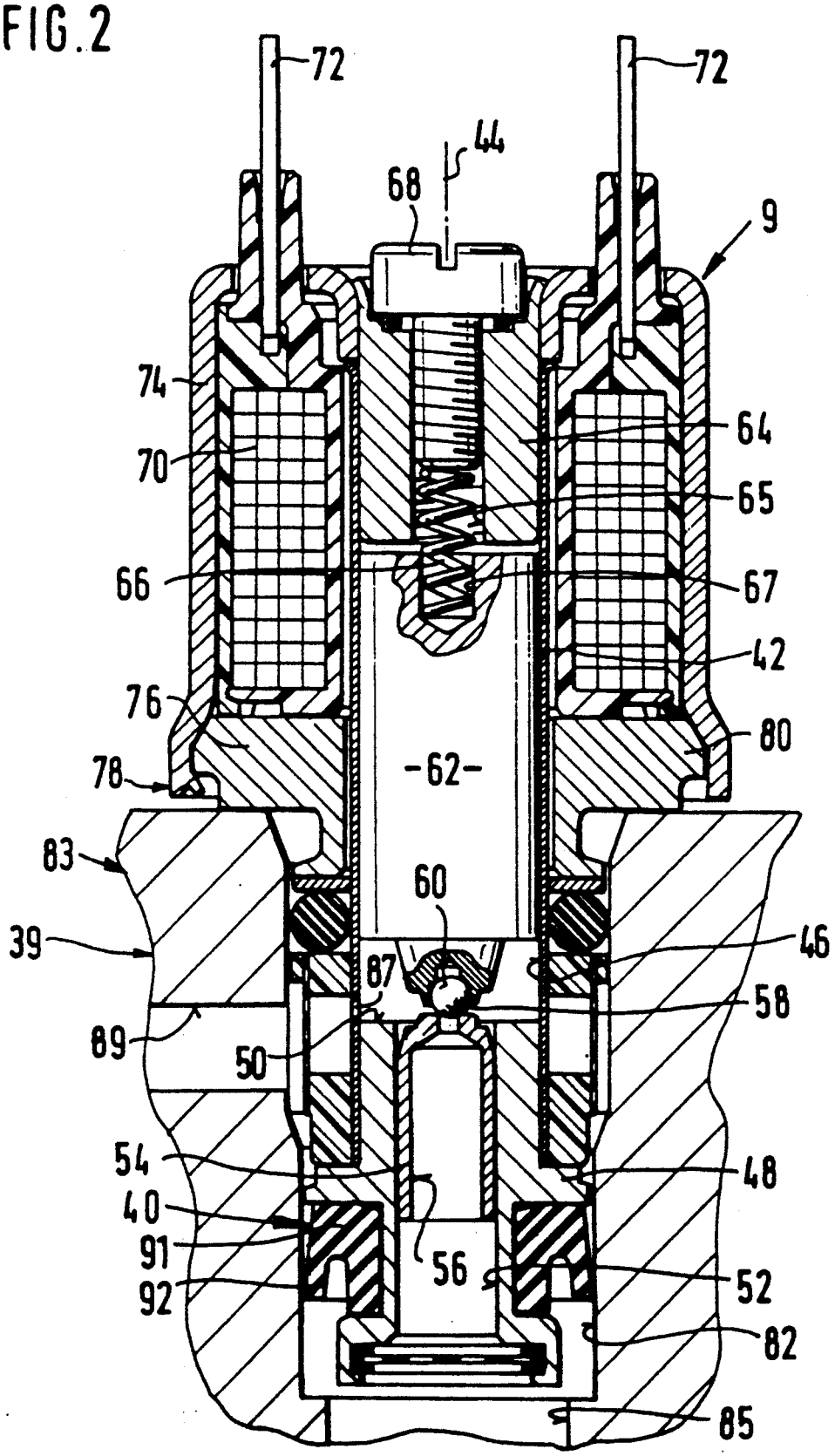
FIG. 2 shows the pressure control device of the brake system of FIG. 1.

FIG. 2 shows the pressure control device 9, which is embodied as a 2/2-way magnet valve and includes the action of both a first spring-loaded check valve and a second check valve 40. The first spring-loaded check valve is also called an overflow valve or pressure shift valve. The pressure control device has an elongated housing sleeve 42, with a longitudinal bore 46 extending concentrically with a longitudinal valve axis 44. A tubular valve seat part 48 protrudes partway into the longitudinal bore 46 in the axial direction on one end of the housing sleeve 42. On its end protruding into the housing sleeve 42, the valve seat part 48 has an upper face end 50, from which a continuous, stepped through bore 52 extends in the valve seat part 48, concentric with the longitudinal valve axis 44. A valve seat sleeve 54 is disposed in the through bore 52 of the valve seat part 48 and is secured immovably, for instance by a press fit. It has a continuous, stepped flow bore 56 extending concentrically with the longitudinal valve axis 44, and a fixed valve seat 58 oriented toward the upper face end 50 of the valve seat part 48.

A valve closing member 60, for instance in the form of a ball, is cooperating with the fixed valve seat 58, the valve closing member is joined directly to a cylindrical armature 62. The valve seat 58 and the valve closing member 60 form a seat valve. The armature 62 is supported slidably in the longitudinal opening 46 of the housing sleeve.

On the side of the armature 62 remote from the valve seat part 48, the pressure control device 9 has an inner pole 64 that is concentric with the longitudinal valve axis 44 and has a continuous longitudinal bore 65. A restoring spring 66 is disposed in the longitudinal bore 65 and rests with one end on a bottom of a blind bore 67 of the armature 62 that is open toward the inner pole 64. With the other end, the restoring spring 66 rests on an adjusting screw 68 screwed into the longitudinal bore 65 of the inner pole 64. The depth to which the adjusting screw 68 is screwed into the longitudinal bore 65 determines the magnitude of the restoring force acting upon the armature 62 and hence upon the valve closing member 60 as well; this restoring force urges the valve closing member 60 towards the fixed valve seat 58.

The armature 62 and the inner pole 64 are at least partly surrounded in the axial direction by a magnet coil 70, which has electrical connection plugs 72 for providing its electrical contact. In the axial direction, a cup-shaped housing jacket 74 fits all the way around the magnet coil 70 and partway around a housing flange part 76 that is oriented toward the valve seat part 48, adjacent to the magnet coil 73. The cup-shaped housing jacket 74 is joined on its end 82 toward the valve seat part 48 to a radially outward-pointing connecting flange 80 of the housing flange part 76, for instance by means of a crimped connection 83.

The pressure control device 9 is for instance disposed in a stepped receiving bore 82 of a housing block 83 and secured to the housing block 83 in a manner not shown, such as by means of a screw connection; the cup-shaped housing jacket 74 and the connection plugs 72 of the magnet coil 70 protrude axially from the receiving bore 82.

On its end remote from the housing flange part 76, the stepped receiving bore 82 of the housing block 83 has a flow segment 85 that communicates with the flow bore 56 of the valve seat sleeve 54 and forms a portion of brake line 11 toward the master brake cylinder. The wall of the housing sleeve 42 is pierced by a single through opening 87, for instance, in the axial direction in the region between the armature 62 and the valve seat part 48. In the housing block 83, a flow conduit 89 extending at right angles to the longitudinal valve axis 44, for example, is formed, which communicates with the receiving bore 82 of the housing block 83 in the region of the through opening 87 of the housing sleeve 42 and forms a portion of the brake 11 toward the wheel brake cylinder.

On the periphery of the valve seat part 48, axially between the flow conduit 89 and the flow segment 85 of the receiving bore 82 of the housing block 83, there is a cuff 91 that forms the second check valve 40. The cuff 91 rests with a sealing lip 92 on the wall of the receiving bore 82 of the housing block 83 and enables a return flow of pressure fluid between the cuff 91 and the wall of the receiving bore 82 from the flow conduit 89 toward the flow segment 85 of the receiving bore 82, or in other words toward the master brake cylinder 3, as long as the pressure of the pressure fluid in the flow conduit 89 toward the wheel brake cylinder exceeds the pressure of the pressure fluid in the flow segment 85 of the housing block 83 toward the master brake cylinder by a valve predetermined by the radially outwardly oriented prestressing of the sealing lip 92. However, the cuff 91 blocks the flow for the pressure fluid from the flow segment 85 of the receiving bore 82 toward the flow conduit 89, or in other words in the opposite direction.

Figure 3:
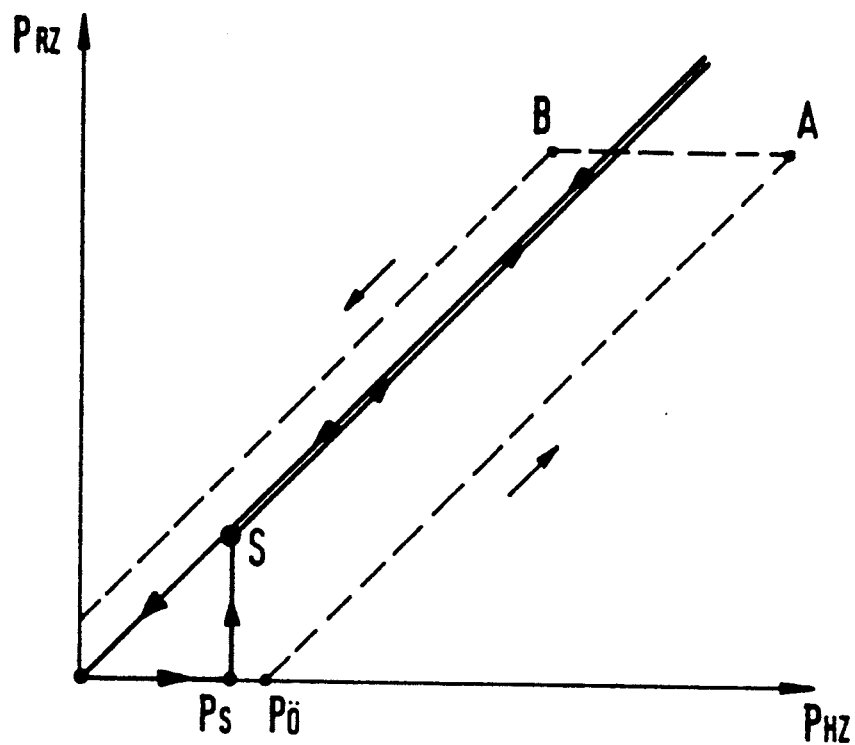
FIG. 3 shows the characteristic curve of a method for switching the pressure control device in accordance with a first exemplary embodiment of the invention.
Figure 4:
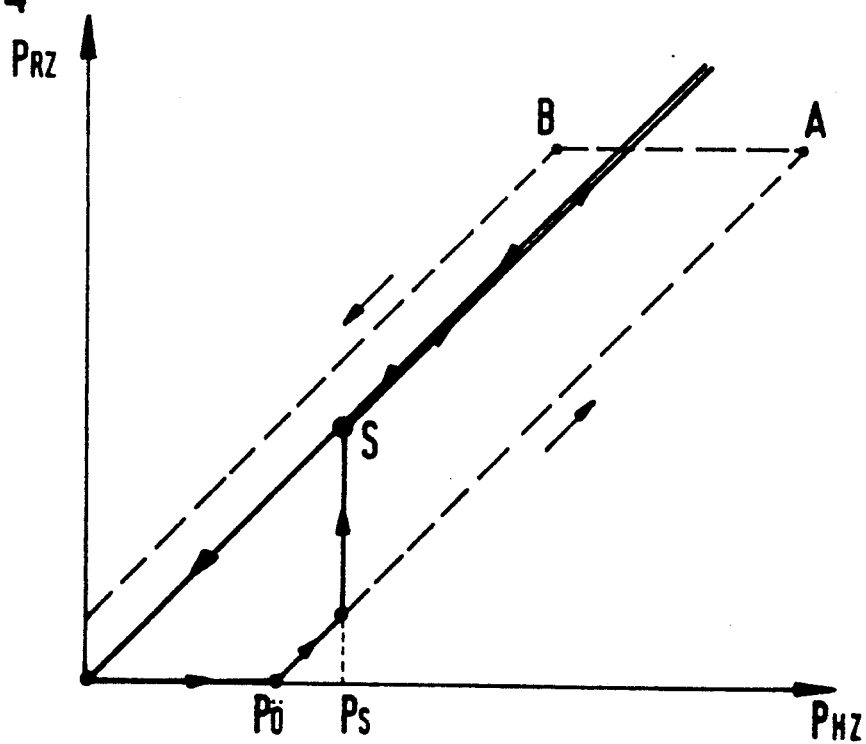
FIG. 4 shows the characteristic curve of a method for switching the pressure control device in accordance with a second exemplary embodiment of the invention.

The mode of operation of the pressure control device 9 and two exemplary embodiments according to the invention of the method for switching the pressure control device will now be described in conjunction with the FIGS. 2, 3 and 4. In the diagrams of FIGS. 3 and 4, the pressure $p_{RZ}$ prevailing on the wheel brake cylinder side of the pressure control device 9 is shown as a function of the pressure $p_{HZ}$ prevailing on the master brake cylinder side of the pressure control device 9.

In the normal situation, in other words with the anti-skid system intact as shown in FIG. 3, a voltage that serves to excite the magnet coil 70 of the magnet valve 39 of the pressure control device 9, which is closed when without current, upon an actuation of the master brake cylinder 3 for braking the vehicle. The method for switching the pressure control device in accordance with the first exemplary embodiment of the invention, as shown in FIG. 3, will be considered first. Upon the actuation of the master brake cylinder 3, the magnet coil 70 is excited only enough that the magnetic force does not suffice to open the magnet valve 39; that is, the magnet valve 39 and thus the pressure control device 9 remain in their blocking position, determined by the spring force of the restoring spring 66. In that case, the flow for the pressure fluid through the pressure control device 9 is blocked. Hence the wheel brake cylinders 5, 7 are pressureless, and the vehicle brakes which can be actuated by the wheel brake cylinders are unactuated. The pressure fluid on the master brake cylinder side in the flow bore 56 of the valve seat sleeve 54 exerts a compressive force counter to the spring force of the restoring spring 66 and tending to lift the valve closing member 60 from its valve seat 58 upon an effective face of the valve closing member 60 toward the master brake cylinder and remote from the armature 62, this base being defined radially outward by the contact of the valve closing member 60 with the valve seat 56, but at low pressures it does not succeed in thus lifting the valve closing member from the valve seat.

If the pressure $p_{HZ}$ of the pressure fluid prevailing on the master brake cylinder side of the pressure control device 9 exceeds a predetermined switching pressure $p_S$ of the pressure control device 9, amounting to 20 bar, for instance, when the master brake cylinder 3 is actuated, then the total of the magnet force of the armature 62 acting upon the valve closing body 60 and the hydraulic pressure force of the pressure fluid acting upon the valve closing member 60 counter to the spring force of the restoring spring 66 suffices to lift the valve closing member 60 from its valve seat 8 counter to the force of the restoring spring 66 to switch the pressure control device 9 into its free open position, in other words to open it.

The lifting of the valve closing member 60 from its valve seat 58 when a switching pressure $p_S$ of the pressure fluid toward the master brake cylinder is attained, and the attendant open position of the pressure control device 9, effect an immediate rise in the pressure $p_{RZ}$ of the pressure fluid toward the wheel brake cylinder, until that pressure $p_{RZ}$ is equal to the pressure $p_{HZ}$ toward the master brake cylinder (as indicated by the dot S). If the pressure of the pressure fluid toward the master brake cylinder is increased beyond the switching pressure $p_S$ because of the actuation of the master brake cylinder 3, then the pressure of the pressure fluid prevailing on the wheel brake cylinder side of the pressure control device 9 rises to the same extent as the pressure prevailing on the master brake cylinder side of the pressure control device 9, so that aside from flow losses, the pressure of the pressure fluid on the wheel brake cylinder side is equally high as on the master brake cylinder side of the pressure control device 9. Upon relief of the wheel brake cylinders 5, 7, the pressure on the master brake cylinder side decreases to the same extent as the pressure of the pressure fluid on the wheel brake cylinder side, as long as the pressure control device 9 is in its open position, so that approximately the same pressure prevails on both sides of the pressure control device.

If the pressure drops below the switching pressure $p_S$ below the point S as well, the magnet force of the magnet coil 70 suffices to keep the armature 62 in its attracted position and thus to keep the magnet valve 39 open. The pressure control device 9 therefore remains in its open position until such time as the pressure $p_{HZ}$ of the pressure fluid on the master brake cylinder side 5 returns to zero. The magnet coil 70 is accordingly designed in such a way, or is excited so weakly, that it brings to bear only relatively slight magnet forces for securely holding the armature 62 and hence the valve closing member 60, and as a result the magnet coil 70 in the excited state heats to a lesser extent than in known pressure control devices. Because the magnet coil 70 is designed for a lesser magnet force or is excited in such a way that it generates only a lesser magnet force, and thus the magnet valve 39 does not open upon every electromagnetic excitation but instead only opens upon reinforcement, resulting from a hydraulic force, by a pressure on the master brake cylinder side of the magnitude of the switching pressure $p_S$, a displacement of the armature 62 and hence of the valve closing member 60 of the magnet valve 39 likewise does not occur upon each actuation of the master brake cylinder 3, thereby advantageously reducing wear.

FIG. 4 shows a method for switching the pressure control device 9 in accordance with the second exemplary embodiment of the invention. Upon an actuation of the master brake cylinder 3, although an excitation of the magnet coil 70 does occur, it is so slight that the magnet valve 39 and hence the pressure control device 9 remain in their blocking position effected by the force of the restoring spring 66. The passage for the pressure fluid through the pressure control device 9 is blocked, so that the wheel brake cylinders 5, 9 are pressureless and the corresponding vehicle brakes are unactuated. If upon actuation of the master brake cylinder 3 the pressure prevailing on the master brake cylinder side of the pressure control device 9 exceeds a predetermined opening pressure $p_ö$ of the pressure control device 9, amounting to 25 bar, for instance, then the valve closing member 60 is lifted slightly from its valve seat 58 by the pressure force of the pressure fluid, acting upon the effective face of the valve closing member remote from the armature 62 and defined radially outward by the diameter of the valve seat 8, this pressure being counter to the spring force of the restoring spring 66, and by the magnet force acting upon the armature 62 connected to the valve closing member 60 counter to the force of the restoring spring 66, and the passage through the pressure control device 9 is uncovered somewhat. The predetermined, characteristic opening pressure $p_ö$ is determined by the magnitude of the spring force of the restoring spring 66 and by the area of the effective face formed on the valve closing member 60 remote from the armature 62. If the pressure of the pressure fluid toward the master brake cylinder is increased beyond the opening pressure $p_ö$ by the actuation of the master brake cylinder 3, then the pressure prevailing on the wheel brake cylinder side of the pressure control device 9 rises in the same proportion as the pressure of the pressure fluid toward the master brake cylinder, but the pressure on the wheel brake cylinder side is reduced compared with the pressure on the master brake cylinder side by a pressure value corresponding to the opening pressure $p_ö$ of the pressure control device 9. In this case, the pressure control device 9 accordingly acts as a first check valve or pressure offset valve.

If the pressure of the pressure fluid prevailing on the master brake cylinder side of the pressure control device 9 then exceeds a predetermined switching pressure $p_S$ of the pressure control device 9, amounting to 30 bar, for instance, then the total of the magnet force acting upon the armature 62 joined to the valve closing member 60 and of the pressure force of the pressure fluid acting upon the effective face of the valve closing member suffices to lift the valve closing member 60 completely from the valve seat 58, counter to the force of the restoring spring 66, to switch the pressure control device 9 to its open position corresponding to the dot S, and thus to render inoperative the effect of the first check valve of reducing the outlet pressure on the wheel brake cylinder side relative to the inlet pressure on the master brake cylinder side by a predetermined pressure value. As a result of the complete lifting of the valve closing member 60 from its valve seat 58, the pressure of the pressure fluid prevailing on the wheel brake cylinder side of the pressure control device 9 immediately rises to the pressure prevailing on the master brake cylinder side of the pressure control device 9. If the pressure of the pressure fluid on the master brake cylinder side is increased still further, then the pressure of the pressure fluid prevailing on the wheel brake cylinder side of the pressure control device 9 rises to the same extent as the pressure prevailing on the master brake cylinder side of the pressure control device 9, so that aside from flow losses, the same pressure of the pressure fluid prevails both on the inlet side toward the master brake cylinder and the outlet side toward the wheel brake cylinder of the pressure control device 9. Upon a relief of the wheel brake cylinders 5, 7, as long as the pressure control device 9 is in its open position, the pressure on the wheel brake cylinder side drops to the same extent as the pressure on the master brake cylinder side, so that both pressures are of approximately equal magnitude. The magnet force of the magnet coil 70 is adequate to keep the magnet valve 39 in the opened position until the pressure on the master brake cylinder side has dropped to zero.

This greatly reduces the switching frequency and hence the wear of the pressure control device, because upon vehicle braking with low pressures of the pressure fluid, the pressure control device is not switched. The magnet coil 70 designed for a lesser magnet force, or excited more weakly, also generates less heat.

FIGS. 3 and 4, in dashed lines, show the mode of operation of the pressure control device 9 if the antiskid system is defective. In that case, the power supply to the magnet coil 70 is interrupted, causing the magnetic field to disappear. The spring force of the restoring spring 66 assures that the passage through the pressure control device 9 closes as a result of the fact that the valve closing member 60 is pressed against the fixed valve seat 58 by the spring force acting in the direction of the valve seat 58, or in other words is in its blocking position. If the master brake cylinder 3 is now actuated in the event of braking, then a quantity of pressure fluid is passed through the brake line 11 via the flow segment 85 of the receiving bore 82 into the pressure control device 9. The pressure fluid in the flow bore 56 of the valve seat 54 exerts a pressure force on the valve closing member 60 counter to the force of the restoring spring 66 on the effective face remote from the armature 62 of the valve closing member 60, which face is defined radially outward by the contact of the valve closing member with the annular valve seat 58. If the pressure of the pressure fluid on the master brake cylinder side of the pressure control device 9, compared to which the pressure of the pressure fluid on the wheel brake cylinder side is negligible because of the action of the second check valve 40, rises beyond the characteristic, preset opening pressure $p_ö$ of the pressure control device, which is predetermined by the magnitude of the spring force of the restoring spring 66 and by the effective face toward the master brake cylinder of the valve closing member 60, so that the pressure force exerted on the valve closing member 60 in the direction of the restoring spring 66 by the pressure fluid is greater than the spring force acting upon the valve closing member 60 on the opposite direction, then the valve closing member 60 lifts from the fixed valve seat 58 and uncovers the passage for the pressure fluid through the through opening 87 of the housing sleeve 42 into the flow conduit 89 of the housing block 83.

The pressure of the pressure fluid toward the wheel brake cylinder in the flow conduit 89 is less than the pressure of the pressure fluid toward the master brake cylinder in the flow segment 85 of the receiving bore 82, by the characteristic opening pressure $p_ö$ predetermined by the spring force of the restoring spring 66 and the effective face of the valve closing member 60, of the currentless magnet valve 39 acting as the first spring-loaded check valve.

If the pressure of the pressure fluid on the master brake cylinder side is lowered from point A to point B, then the seat valve formed by the valve closing member 60 and the valve seat 58 also closes without delay, because the spring force of the restoring spring 66 presses the valve closing member 60 against the fixed valve seat 58 as soon as the master brake cylinder side pressure acting upon the effective face of the valve closing member is no longer greater, by the spring force of the restoring spring 66, than the pressure on the wheel brake cylinder side acting upon the armature 62 in the opposite direction. Accordingly, the seat valve acts as the first check valve of the pressure control device 9, which can also be called an overflow valve or pressure offset valve. If the pressure on the master brake cylinder side drops below the pressure on the wheel brake cylinder side, then if a predetermined, relatively small pressure difference is exceeded, the sealing lip 92 of the cuff 91 resting on the wall of the receiving bore 82 of the housing block 83 separates from the wall and enables the return flow of the pressure fluid on the wheel brake cylinder side in the direction of the master brake cylinder 3, past the circumference of the pressure control device 9. Thus the cuff 91, with its sealing lip 92, takes on the function of the second check valve 40.

The method according to the invention for switching the pressure control device 9 make it possible to lessen the switching frequency, and hence the wear on the pressure control device, by providing that the pressure control device is not switched when the pressures of the pressure fluid on the master brake cylinder side are low. In addition, the magnet coil 70 needs to generate only comparatively slight magnet forces, and severe heating of the magnet coil is avoided.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A method for switching a pressure control device, which is disposed between a master brake cylinder and a wheel brake cylinder in a hydraulic brake system for motor vehicles, having an anti-skid system, wherein the pressure control device has a valve closing member that cooperates with a valve seat, an armature connected to the valve closing member, a magnet coil, and a pole piece, the method comprises exciting the magnet coil upon actuation of the master brake cylinder such that a magnet force on the control device is insufficient to open the pressure control device (9) by itself, but is high enough to keep the pressure control device (9) in a completely open position, and the motion of the pressure control device (9) to completely open position does not take place until a predetermined switching pressure ($p_S$) is exceeded by a pressure force of a pressure prevailing on a master brake cylinder side of the pressure control device (9) and the magnet force of the magnet coil (70).

2. A method as defined by claim 1, in which the predetermined switching pressure ($p_S$) required for switchover to an open position of the pressure control device is lower than a predetermined opening pressure ($p_ö$) of the pressure control device (9).

3. A method as defined by claim 2, in which the valve closing member (60) is provided on a wheel brake cylinder side, and the valve seat (58) is provided on the master brake cylinder side, in the pressure control device (9).

4. A method as defined by claim 1, in which the pressure control device (9) opens at an opening pressure ($p_ö$) on a master brake cylinder side that is lower than the predetermined switching pressure ($p_S$), and the motion of the pressure control device (9) to its completely open position does not take place until the predetermined switching pressure ($p_S$) is exceeded.

5. A method as defined by claim 4, in which the valve closing member (60) is provided on a wheel brake cylinder side, and the valve seat (58) is provided on the master brake cylinder side, in the pressure control device (9).

6. A method as defined by claim 1, in which the valve closing member (60) is provided on a wheel brake cylinder side, and the valve seat (58) is provided on the master brake cylinder side, in the pressure control device (9).

* * * * *